(12) United States Patent
Kuo

(10) Patent No.: US 8,321,740 B2
(45) Date of Patent: Nov. 27, 2012

(54) METHOD AND APPARATUS OF HANDLING TTI BUNDLING

(75) Inventor: Richard Lee-Chee Kuo, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 623 days.

(21) Appl. No.: 12/538,876

(22) Filed: Aug. 11, 2009

(65) Prior Publication Data

US 2010/0042884 A1 Feb. 18, 2010

Related U.S. Application Data

(60) Provisional application No. 61/089,056, filed on Aug. 15, 2008.

(51) Int. Cl.
*H04L 1/18* (2006.01)
(52) U.S. Cl. ...................................................... 714/748
(58) Field of Classification Search .................. 714/748, 714/749
See application file for complete search history.

(56) References Cited

FOREIGN PATENT DOCUMENTS

| KR | 1020080030941 A | 4/2008 |
|---|---|---|
| WO | 2008041824 A2 | 4/2008 |

OTHER PUBLICATIONS

3GPP Document R2-081326, "Reply LS on Uplink Coverage for LTE", Feb. 2008.
3GPP Document R2-082859, "RAN2#62 LTE UP Session Report", May 2008.
3GPP Document R2-083107, "Bundling Issues", Jun. 2008.
3GPP Document R2-083726, "RAN2#62bis LTE UP Session Report", Jun. 2008.
3GPP Document R2-083724, "TTI Bundling", Jun. 2008.
3GPP Document R2-083899, "Text for MAC reset and reconfiguration", Aug. 2008.
Alcatel-Lucent: "RAN2 aspects of the solutions for Subframe Bundling", 3GPP TSG-RAN WG2 #61 bis, R2-081446, Mar. 31-Apr. 4, 2008, XP050139195, Shenzhen, China.
Ericsson: "Text Proposal for TTI bundling", 3GPP TSG-RAN WG2 #62, R2-082149, update of R2-081466, May 5-9, 2008, pp. 1/6 to 6/6, XP050139928, Kansas City, USA.
CR for R2-086144 Clarification on UE behaviour at TTI bundling configuration—alt1.
CR for R2-086144 Clarification on UE behaviour at TTI bundling configuration—alt2.
Disc for R2-086144 Clarification on UE behaviour at TTI bundling configuration.
Office Action on corresponding foreign application (JP2009-188089) from JPO dated Sep. 20, 2011.
Office Action on corresponding foreign application (KR10-2009-0075675) from KIPO dated Oct. 28, 2011.

*Primary Examiner* — James C Kerveros
(74) *Attorney, Agent, or Firm* — Blue Capital Law Firm, P.C.

(57) ABSTRACT

A method for handling a Transmission Time Interval (TTI) bundling mode in a user equipment (UE) of a wireless communication system is disclosed. The method includes steps of switching an operation status of the TTI bundling mode; and flushing all uplink Hybrid Automatic Repeat Request (HARQ) buffers in the UE when the operation status of the TTI bundling mode is switched.

10 Claims, 9 Drawing Sheets

METHOD AND APPARATUS OF HANDLING TTI BUNDLING

CROSS REFERENCE TO RELATED APPLICATIONS

This application claims the benefit of U.S. Provisional Application No. 61/089,056, filed on Aug. 15, 2008 and entitled "Method and Apparatus for Improving TTI Bundling in a Wireless Communication System", the contents of which are incorporated herein by reference.

BACKGROUND OF THE INVENTION

1. Field of the Invention

The present invention relates to a method and apparatus for handling transmission time interval (TTI) bundling, and more particularly, to a method and apparatus for handling TTI bundling in a user equipment (UE) of a wireless communication system.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

In LTE, a technique of transmission time interval (TTI) bundling is introduced for improving uplink coverage according to the prior art. TTI bundling is performed by repeatedly coding and transmitting a same transport block in a set of consecutive subframes (e.g. TTI), and those repeatedly transmitted packets are named a bundle. UEs in cell boundary utilizing TTI bundling can reduce transmission delay and signaling of control channels, and enhance reliability and accuracy of transmission, such that LTE uplink coverage can be improved.

According to current specifications, TTI bundling is characterized as below:

(1) The same HARQ process is used for each packet of a bundle.

(2) TTI bundling is switched on/off per UE with higher layer signaling, e.g. Radio Resource Control (RRC) signaling. When switched on, TTI bundling would apply to all uplink transmissions using Physical Uplink Shared Channel (PUSCH).

(3) A bundle is treated as a single resource, i.e., a single grant and a single HARQ feedback (e.g. acknowledgement signal ACK or non-acknowledgement signal NACK) is used for each bundle.

(4) The retransmission of a bundle is also a bundle.

It is worth noting that the timing relationship between the last transmission of a bundle and its HARQ feedback is the same as the normal HARQ operation (i.e. non-bundled operation), and that the HARQ Round Trip Time (RTT) for TTI bundling is twice the RTT of normal HARQ operation. That is to say, if the last transmission of a bundle occurs at TTI n, the HARQ feedback is received at TTI (n+4); and if a first transmission of a bundle occurs at TTI k, retransmission of the bundle starts at TTI (k+2*HARQ_RTT), where HARQ_RTT represents the round trip time of the normal HARQ operation. In addition, the size of a bundle, i.e. the number of TTIs required to transmit a bundle, is fixed as 4.

According to 3GPP meeting document R2-083726, the number of HARQ processes is reduced from 8 to 4 when TTI bundling is configured. In other words, the number of HARQ processes changes when the UE activates or deactivates the TTI bundling mode. As for detailed HARQ operations for TTI bundling, please refer to related meeting document R2-083724.

However, when TTI bundling is switched on (i.e. configured or activated), there is no special action specified in the prior art for the transport blocks (TBs) already stored in the uplink HARQ buffers. Based on the specification proposed in the meeting document R2-083724, these TBs may induce non-adaptive retransmissions in bundle way. Since uplink grants for these TBs were allocated before configuration of TTI bundling, retransmissions of these TBs should not be considered bundle retransmissions. Otherwise, it may cause interference to other UEs' transmissions. Besides, even the first non-adaptive retransmissions of these TBs (e.g. performed in a non-bundled way) after configuration of TTI bundling should not be generated because the timings of the corresponding HARQ processes have been shifted. Note that the number of HARQ processes is reduced to 4 after TTI bundling is configured, which causes the timing shifts. And, timing shift of an HARQ process means the allocated resources are used at a different timing from what have been scheduled, which may cause interference to other UEs' transmissions.

The similar situation occurs after TTI bundling is switched off (or deactivated) i.e. non-adaptive retransmissions of the old TBs may cause interference to other UEs' transmissions due to timing shifts of the HARQ processes.

On the other hands, the HARQ RTT for TTI bundling is doubled compared with the normal transmission operation. Please refer to FIG. 1, which is a schematic diagram of packet transmission and reception of a UE under the TTI bundling mode. Assuming that the length of TTI is T, and HARQ_RTT represents an HARQ RTT of the normal transmission operation with a fixed length 8T. Packets P1, P2, P3 and P4 are corresponding to a same transport block and transmitted at 4 consecutive TTIs from a UE, which means the packets P1, P2, P3 and P4 form a bundle BDL. When the UE finishes transmitting the bundle BDL at a time point 4T, the network end generates an HARQ feedback (i.e. acknowledgement signal ACK or non-acknowledgement signal NACK) between time points 7T and 8T to indicate the reception status of the bundle BDL. In this case, the packet P4 is not received successfully by the network end, so the network end transmits a non-acknowledgement signal NACK. When the UE receives the non-acknowledgement signal NACK from the network end between the time points 7T and 8T, the UE cannot retransmit the bundle BDL at a starting point of the next HARQ_RTT (i.e. at a time point 8T) since the processing time is too short. As a result, the UE starts to retransmit the bundle BDL after waiting for an HARQ RTT, namely at a time point 16T.

Simply speaking, the UE receives the HARQ feedback from the network end at the fourth TTI after transmitting the bundle BDL, and determines whether the bundle BDL needs to be retransmitted accordingly. If the bundle BDL needs to be retransmitted, the UE has to wait for an HARQ RTT to perform retransmission of the bundle BDL, i.e. transmit a retransmission bundle BDL_1. Thus, the HARQ RTT for TTI bundling is doubled compared with the normal transmission operation, which may cause transmission delay.

SUMMARY OF THE INVENTION

It is therefore an objective of the present invention to provide a method and apparatus for handling a Transmission Time Interval (TTI) bundling mode in a user equipment (UE) of a wireless communication system.

According to the present invention, a method for handling a Transmission Time Interval (TTI) bundling mode in a user equipment (UE) of a wireless communication system is disclosed. The method includes steps of switching an operation status of the TTI bundling mode; and flushing all uplink Hybrid Automatic Repeat Request (HARQ) buffers in the UE when the operation status of the TTI bundling mode is switched.

According to the present invention, a communications device for handling a Transmission Time Interval (TTI) bundling mode in a user equipment (UE) of a wireless communication system is disclosed. The communications device includes a processor for executing a program, and a memory, coupled to the processor, for storing the program. The program includes steps of switching an operation status of the TTI bundling mode; and flushing all uplink Hybrid Automatic Repeat Request (HARQ) buffers in the UE when the operation status of the TTI bundling mode is switched.

According to the present invention, a method for handling a Transmission Time Interval (TTI) bundling mode in a user equipment (UE) of a wireless communication system is disclosed. The method includes steps of providing two sets of HARQ process configuration parameters, individually corresponding to the TTI bundling mode and a normal HARQ transmission mode; and selecting one from the two sets of HARQ process configuration parameters for configuring HARQ processes of the UE when the UE is switched between the TTI bundling mode and the normal HARQ transmission mode; wherein the HARQ processes for the TTI bundling mode and those for the normal HARQ transmission mode are independent of each other and do not exist in the UE at the same time.

According to the present invention, a communications device for handling a Transmission Time Interval (TTI) bundling mode in a user equipment (UE) of a wireless communication system is disclosed. The communications device includes a processor for executing a program, and a memory, coupled to the processor, for storing the program. The program includes steps of providing two sets of HARQ process configuration parameters, individually corresponding to the TTI bundling mode and a normal HARQ transmission mode; and selecting one from the two sets of HARQ process configuration parameters for configuring HARQ processes of the UE when the UE is switched between the TTI bundling mode and the normal HARQ transmission mode; wherein the HARQ processes for the TTI bundling mode and those for the normal HARQ transmission mode are independent of each other and do not exist in the UE at the same time.

According to the present invention, a method for handling a Transmission Time Interval (TTI) bundling mode in a user equipment (UE) of a wireless communication system is disclosed. The method includes steps of transmitting a bundle, the bundle comprising a plurality of sub-packets corresponding to a transport block, the plurality of sub-packets being sequentially transmitted at a purity of consecutive TTIs, the number of the plurality of consecutive TTIs being a bundle size of the bundle; performing retransmission of the bundle according to an HARQ feedback of the bundle to form a retransmission bundle; and determining a start transmission time of the retransmission bundle according to UE capability and the bundle size.

According to the present invention, a communications device for handling a Transmission Time Interval (TTI) bundling mode in a user equipment (UE) of a wireless communication system is disclosed. The communications device includes a processor for executing a program, and a memory, coupled to the processor, for storing the program. The program includes steps of transmitting a bundle, the bundle comprising a plurality of sub-packets corresponding to a transport block, the plurality of sub-packets being sequentially transmitted at a purity of consecutive TTIs, the number of the plurality of consecutive TTIs being a bundle size of the bundle; performing retransmission of the bundle according to an HARQ feedback of the bundle to form a retransmission bundle; and determining a start transmission time of the retransmission bundle according to UE capability and the bundle size.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
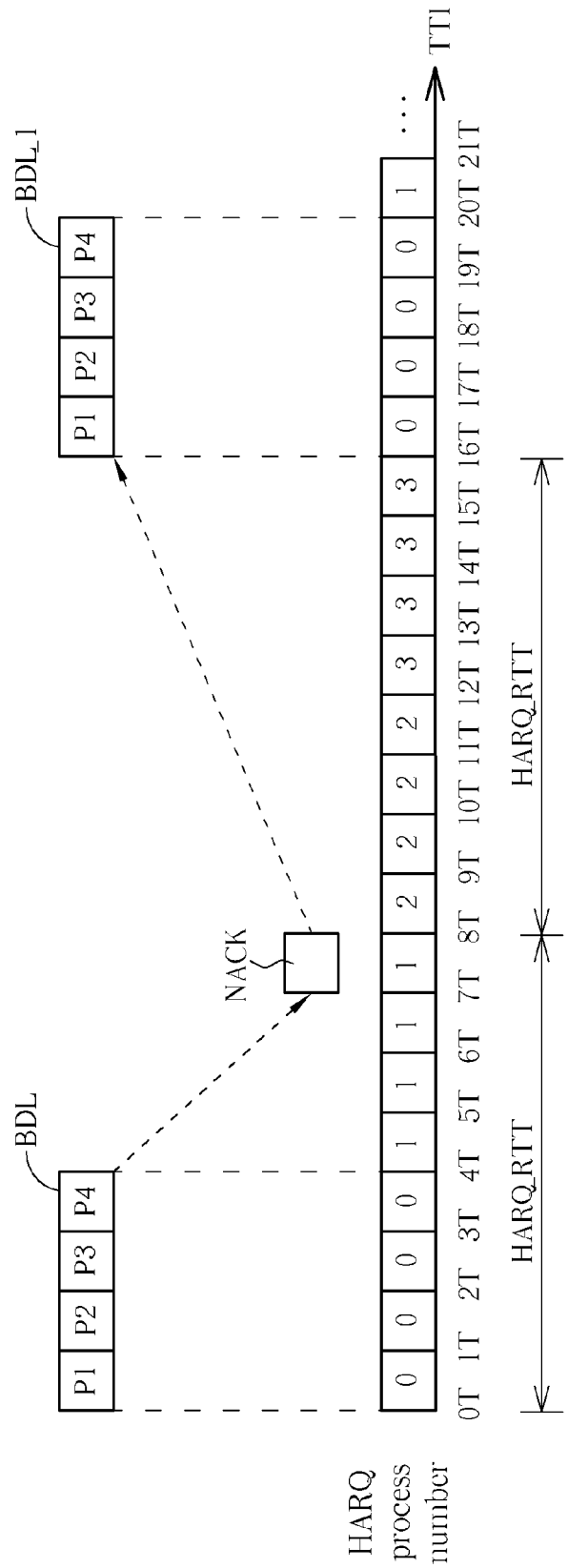
FIG. 1 is a schematic diagram of packet transmission and reception of a UE under a TTI bundling mode according to the prior art.
Figure 2:
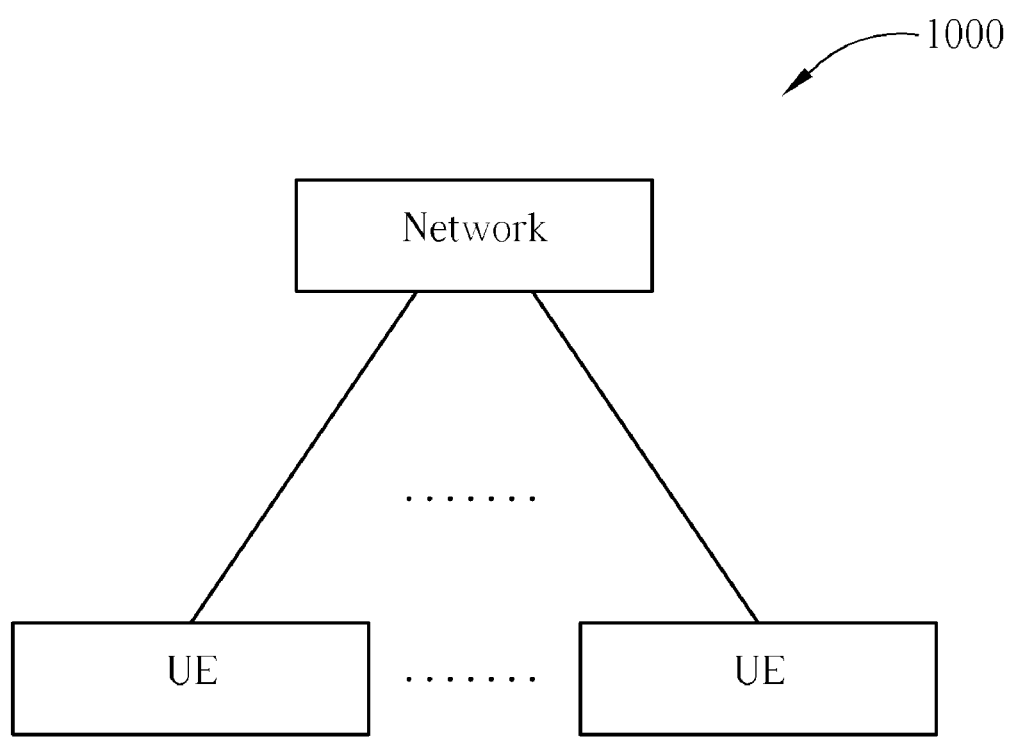
FIG. 2 is a schematic diagram of a wireless communications system.

Please refer to FIG. 2, which illustrates a schematic diagram of a wireless communications system 1000. The wireless communications system 1000 is preferred to be a Long Term Evolution (LTE) system, and is briefly composed of a network and a plurality of user equipments (UEs). In FIG. 2, the network and the UEs are simply utilized for illustrating the structure of the wireless communications system 1000. Practically, the network may comprise a plurality of base stations (Node Bs), radio network controllers and so on according to actual demands, and the UEs can be devices such as mobile phones, computer systems, etc.

Figure 3:
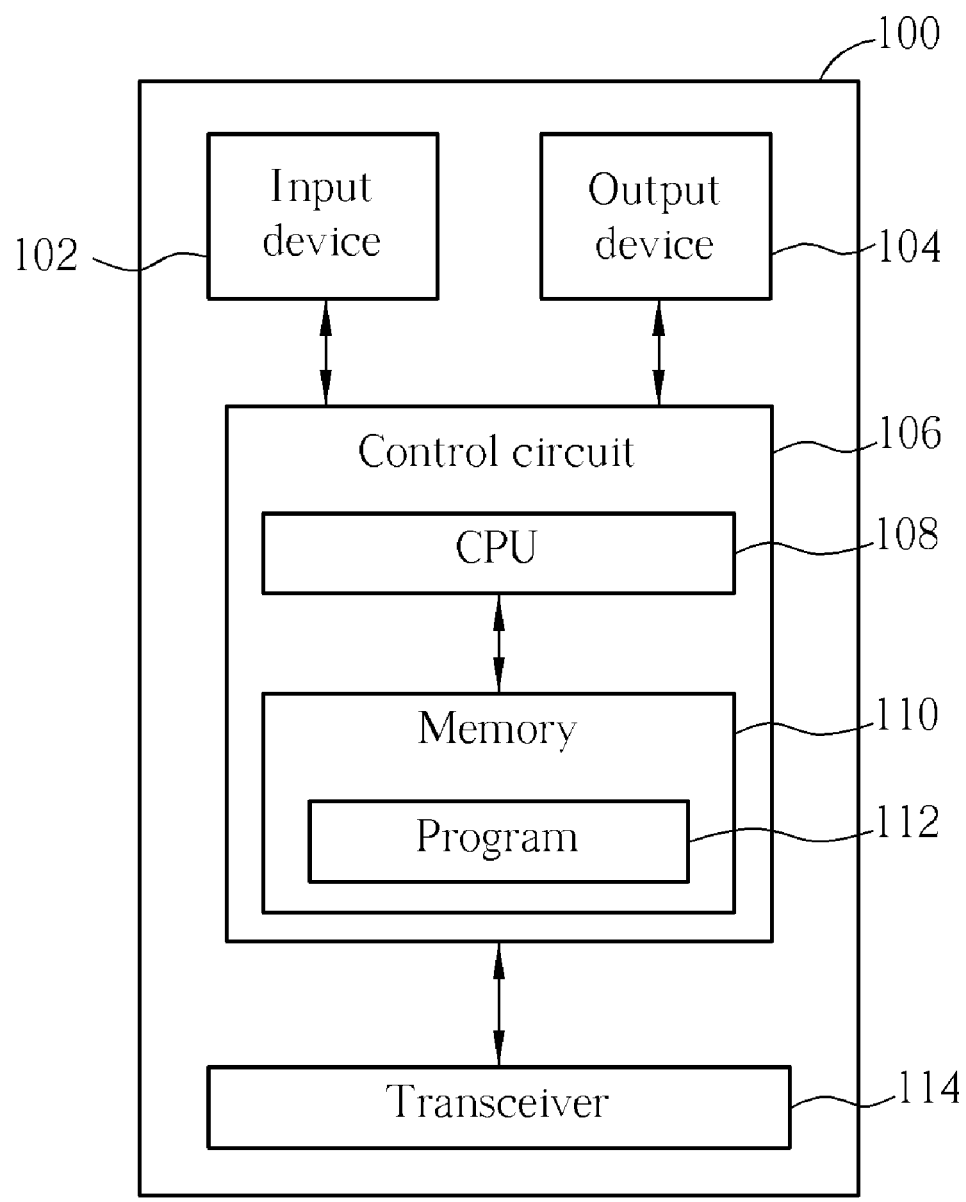
FIG. 3 is a function block diagram of a wireless communications device.

Please refer to FIG. 3, which is a functional block diagram of a communications device 100 in a wireless communications system. The communications device 100 can be utilized for realizing the UEs in FIG. 2, and the wireless communications system is preferably the LTE system. For the sake of brevity, FIG. 3 only shows an input device 102, an output device 104, a control circuit 106, a central processing unit (CPU) 108, a memory 110, a program 112, and a transceiver 114 of the communications device 100. In the communications device 100, the control circuit 106 executes the program 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 4:
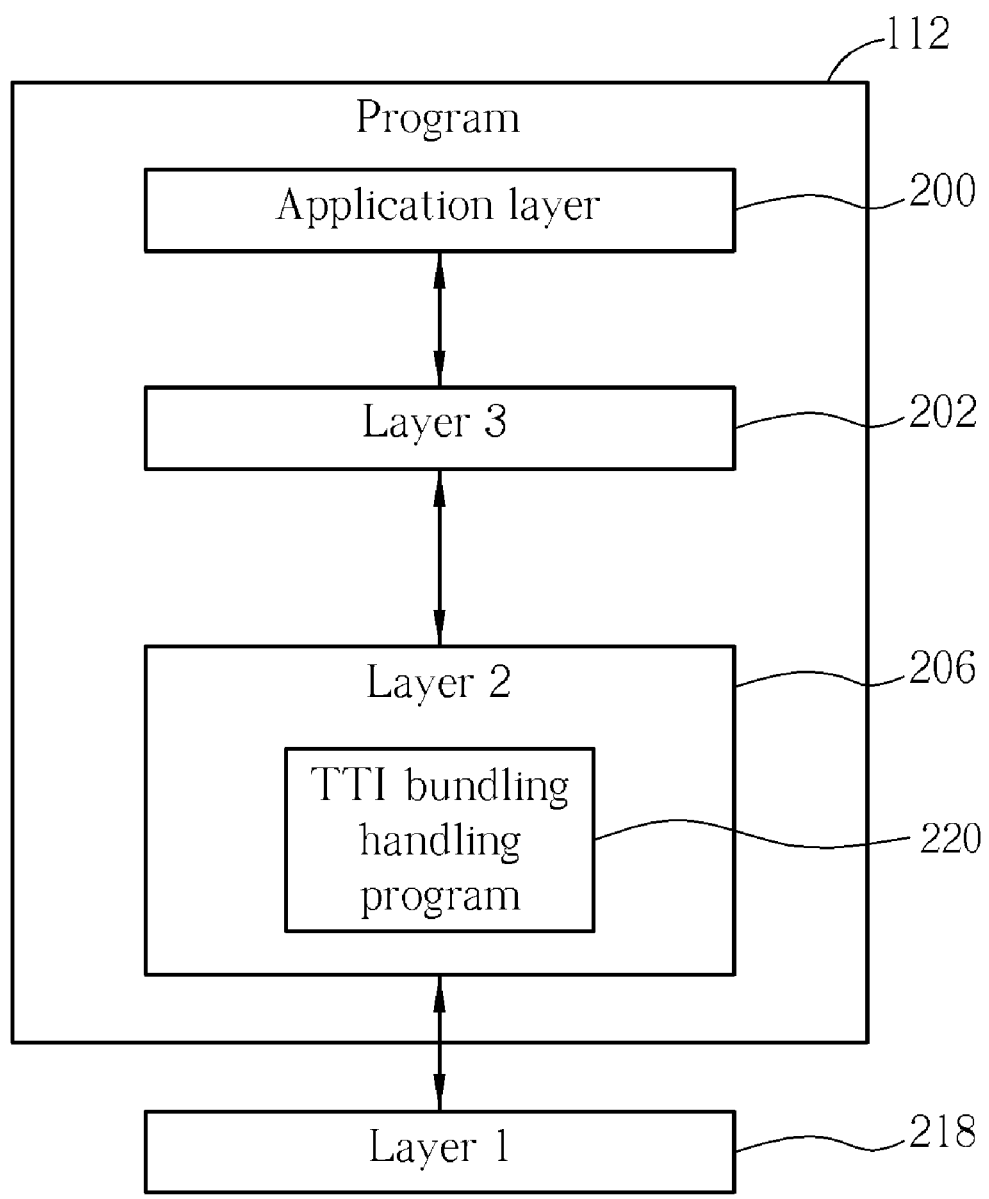
FIG. 4 is a diagram of program of FIG. 3.

Please continue to refer to FIG. 4. FIG. 4 is a schematic diagram of the program 112 shown in FIG. 3. The program 112 includes an application layer 200, a Layer 3 202, and a Layer 2 206, and is coupled to a Layer 1 218. The Layer 3 202 is used for performing radio resource control. The Layer 2 206 includes a Radio Link Control (RLC) entity and a Medium access control (MAC) entity, and is used for performing link control. The Layer 1 218 is used for performing physical connection.

In LTE, the MAC layer of the Layer 2 206 can operate in a transmission time interval (TTI) bundling mode for enhancing reliability and accuracy of transmission, so as to improve uplink coverage. TTI bundling is switched on/off per UE with higher layer signaling, e.g. Radio Resource Control (RRC) signaling. When switched on, TTI bundling would apply to all uplink transmissions using Physical Uplink Shared Channel (PUSCH). Under the TTI bundling mode, a single transport block is coded and transmitted in a plurality of consecutive TTIs. In this case, the embodiment of the present invention provides a TTI bundling handling program 220 to improve TTI bundling transmissions and enhance system performance.

Figure 5:
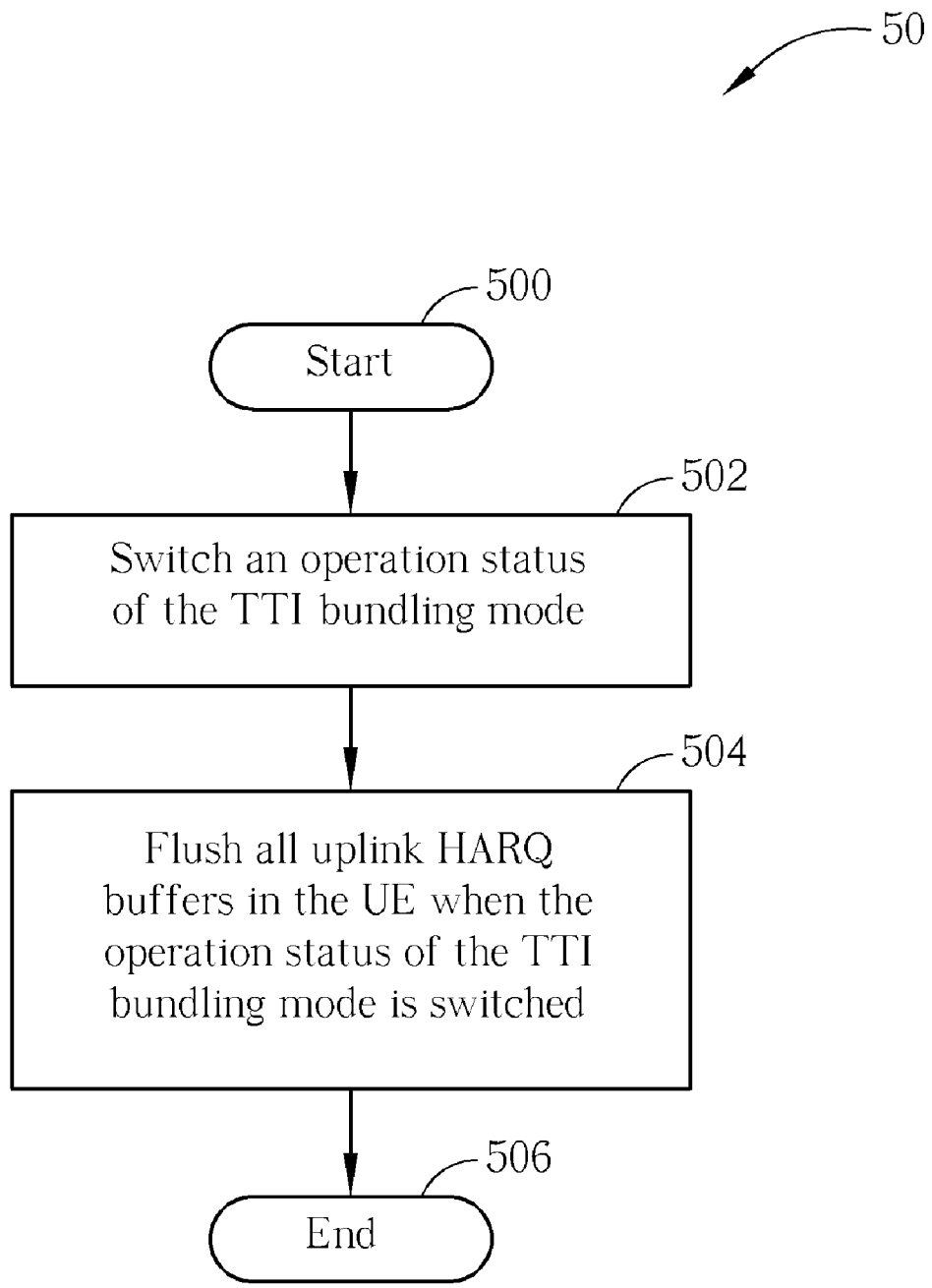
FIG. 5 to FIG. 7 is a flowchart of a process according to an embodiment of the present invention, respectively.

Please refer to FIG. 5, which is a flow chart of a process 50 according to an embodiment of the present invention. The process 50 is used for handling a TTI bundling mode in a UE of the wireless communication system 1000, and can be compiled into the TTI bundling handling program 220. The process 50 includes the following steps:

Step 500: Start.

Step 502: Switch an operation status of the TTI bundling mode.

Step 504: Flush all uplink Hybrid Automatic Repeat Request (HARQ) buffers in the UE when the operation status of the TTI bundling mode is switched.

Step 506: End.

Figure 6:
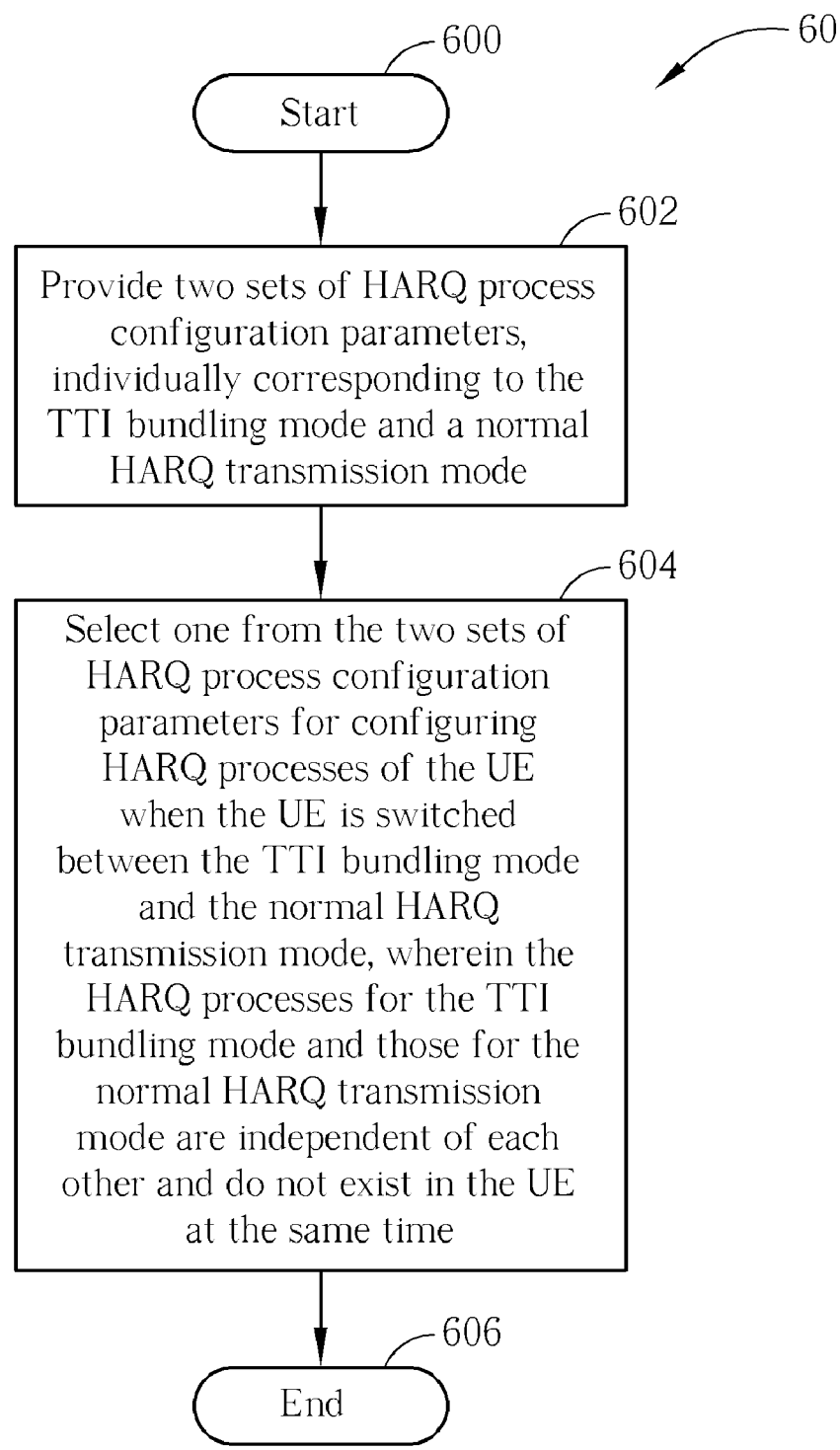

According to the process 50, when the operation status of the TTI bundling mode is switched, the embodiment of the present invention flushes all uplink HARQ buffers of the UE. The step of switching the operation status of the TTI bundling mode can be switching on (activating) the TTI bundling mode or switching off (deactivating) the TTI bundling mode. Therefore, the embodiment of the present invention can prevent transport blocks (TBs) already stored in the uplink HARQ buffers from being improperly retransmitted, and thus avoid interference to other UEs' transmissions Besides, please refer to FIG. 6, which is a flow chart of a process 60 according to an embodiment of the present invention. The process 60 is used for handling a TTI bundling mode in a UE of the wireless communication system 1000, and can be compiled into the TTI bundling handling program 220. The process 60 includes the following steps:

Step 600: Start.

Step 602: Provide two sets of HARQ process configuration parameters, individually corresponding to the TTI bundling mode and a normal HARQ transmission mode.

Step 604: Select one from the two sets of HARQ process configuration parameters for configuring HARQ processes of the UE when the UE is switched between the TTI bundling mode and the normal HARQ transmission mode, wherein the HARQ processes for the TTI bundling mode and those for the normal HARQ transmission mode are independent of each other and do not exist in the UE at the same time.

Step 606: End.

According to the process 60, the embodiment of the present invention provides two sets of HARQ process configuration parameters, individually corresponding to the TTI bundling mode and a normal HARQ transmission mode. The normal transmission mode is a transmission mode that the TTI bundling mode is switched off. When the UE is switched between the TTI bundling mode and the normal HARQ transmission mode, the embodiment of the present invention selects a corresponding set of HARQ process configuration parameters from the two sets of HARQ process configuration parameters for configuring the HARQ processes of the UE. The HARQ processes for the TTI bundling mode and those for the normal HARQ transmission mode are independent of each other and do not exist in the UE at the same time.

Preferably, the said HARQ process configuration parameters include the number of HARQ processes, a buffer size, a maximum transmission number, and associated coding/decoding information. Therefore, when the TTI bundling mode is activated or deactivated, the UE according to the embodiment of the present invention can configure a set of HARQ processes different from the original used one according to the relevant HARQ configuration parameters, so as to avoid HARQ operation error caused by mode switching, such as improperly retransmission of transport blocks (TBs) already stored in the uplink HARQ buffers, which may cause interference to other UEs' transmissions.

Please note that, in the embodiment of the present invention, the UE does not maintain two sets of HARQ processes at the same time, but refreshes the HARQ configurations to generate a new set of HARQ processes when the mode switching is performed. Thus, the HARQ processes for the TTI bundling mode and those for the normal HARQ transmission mode are independent of each other and do not exist in the UE at the same time.

Figure 7:
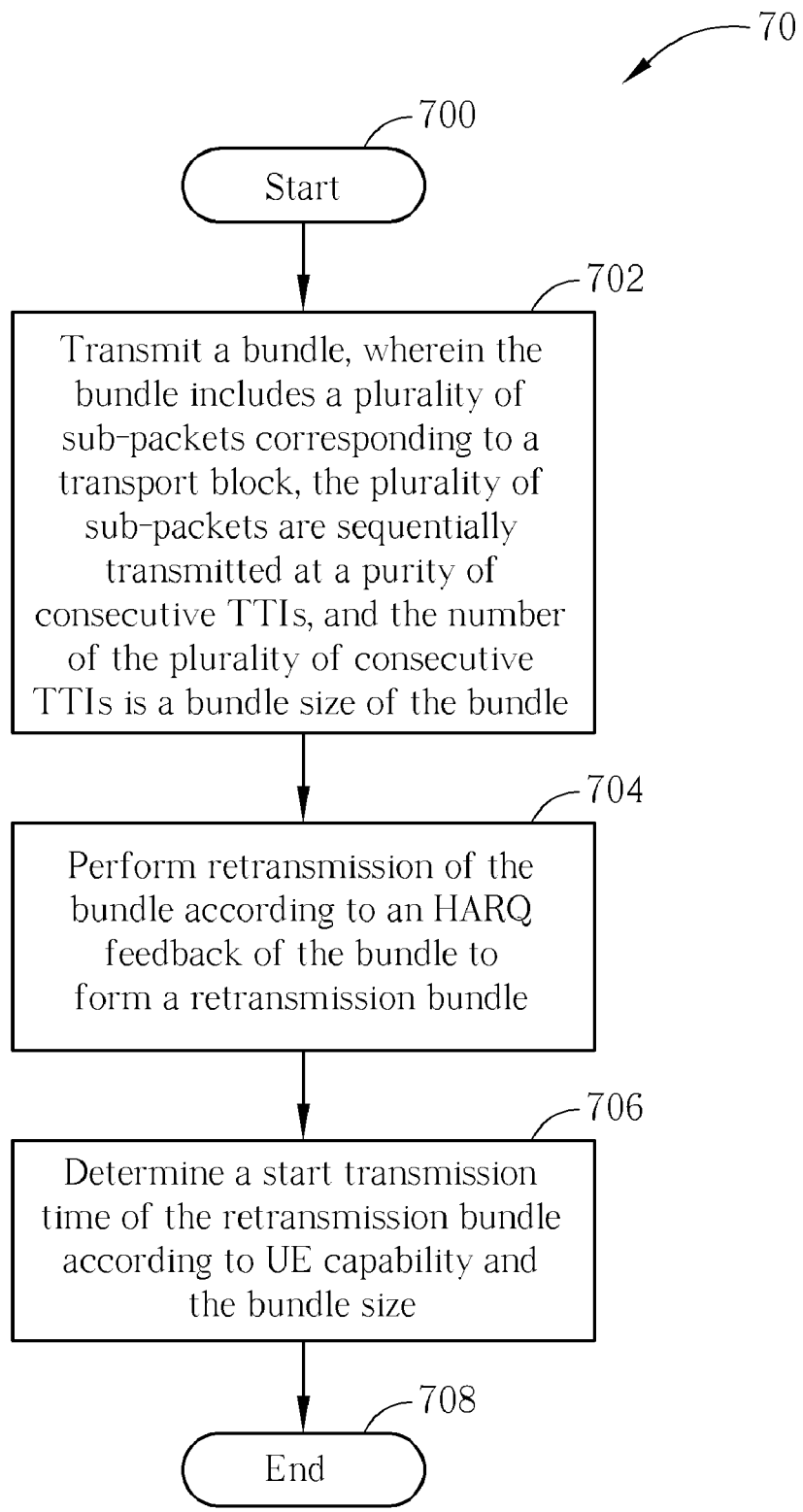

On the other hand, please refer to FIG. 7. FIG. 7 is a flow chart of a process 70 according to an embodiment of the present invention. The process 70 is used for handling a TTI bundling mode in a UE of the wireless communication system 1000, and can be compiled into the TTI bundling handling program 220. The process 70 includes the following steps:

Step 700: Start.

Step 702: Transmit a bundle, wherein the bundle includes a plurality of sub-packets corresponding to a transport block, the plurality of sub-packets are sequentially transmitted at a purity of consecutive TTIs, and the number of the plurality of consecutive TTIs is a bundle size of the bundle.

Step 704: Perform retransmission of the bundle according to an HARQ feedback of the bundle to form a retransmission bundle.

Step 706: Determine a start transmission time of the retransmission bundle according to UE capability and the bundle size.

Step 708: End.

According to the process 70, the UE according to the embodiment of the present invention first transmits a bundle, which includes a plurality of sub-packets corresponding to a transport block. The plurality of sub-packets is sequentially transmitted at a purity of consecutive TTIs, and the number of the plurality of consecutive TTIs is a bundle size of the bundle. Then, the UE performs retransmission of the bundle according to an HARQ feedback of the bundle to form a retransmission bundle. Finally, the UE determines a start transmission time of the retransmission bundle according to UE capability and the bundle size.

Preferably, the number of TTIs between a last transmission of the bundle and a first transmission of the retransmission bundle is a multiple of the bundle size. In such a situation, the embodiment of the present invention can determine the start transmission time of the retransmission bundle according to the UE capability and the bundle size. Within the TTI bundling mode, an HARQ Round Trip Time (HARQ RTT) equals to a duration between the first transmission of the bundle and that of the retransmission bundle Therefore, the embodiment of the present invention can further determine the HARQ RTT of the TTI bundling mode.

Figure 8:
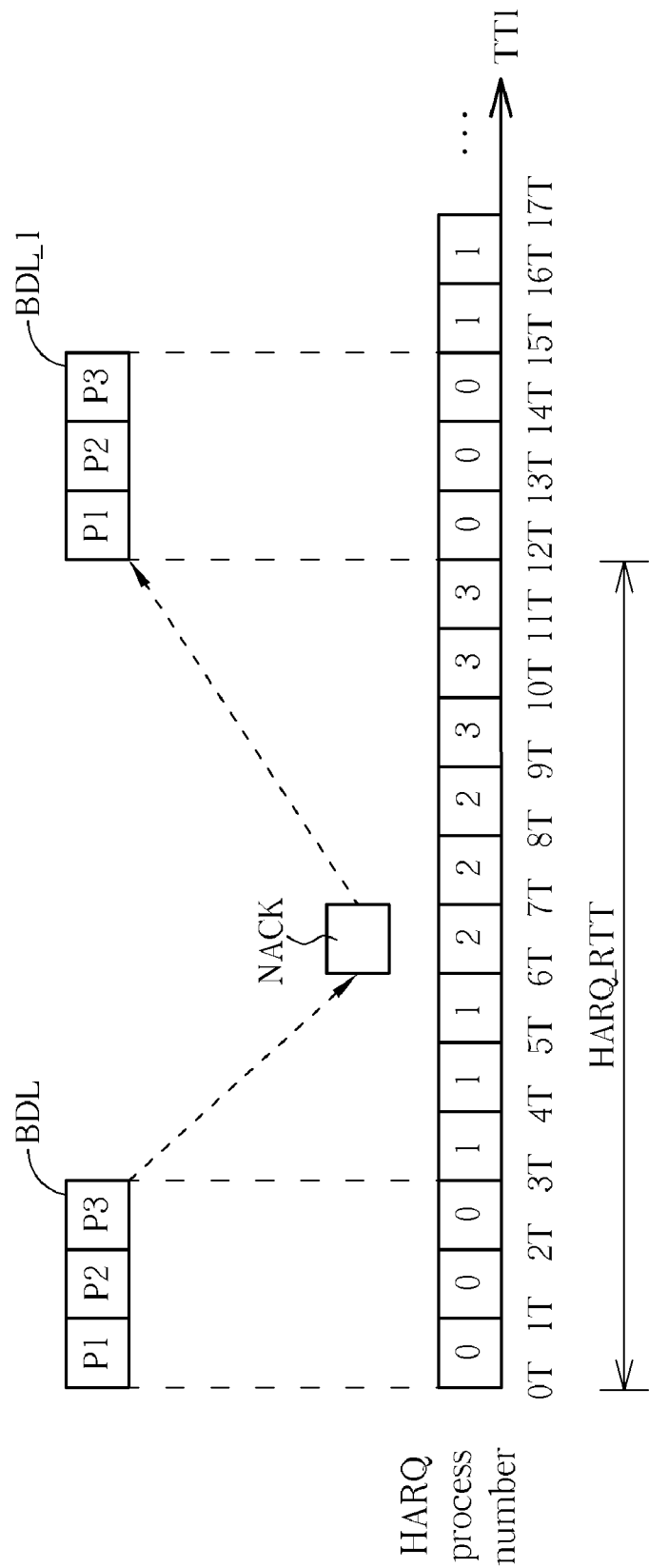
FIG. 8 to FIG. 9 illustrates an exemplary embodiment according to the process of FIG. 7, respectively.

For example, please refer to FIG. 8, which illustrates an exemplary embodiment according to the process 70 of the present invention. In FIG. 8, the length of TTI is T, packets P1, P2 and P3 are corresponding to a same transport block and transmitted at 3 consecutive TTIs from a UE, which means the packets P1, P2 and P3 form a bundle BDL, and the size of the bundle BDL is 3 TTIs. Assuming that the HARQ feedback is transmitted at a timing point that is four TTIs behind the last transmission of the bundle BDL (i.e. timing points 6T to 7T), and the UE requires at least four TTIs to prepare for retransmission of the bundle BDL after the HARQ feedback NACK is received (i.e. the UE capability is 4 TTIs and a retransmission bundle BDL_1 should be performed after a timing point 11T). In this case, since the number of TTIS between the last transmission of the bundle BDL (i.e. a timing point 3T) and the first transmission of the retransmission bundle BDL_1 should be a multiple of the bundle size, the start transmission time of the retransmission bundle BDL_1 is then determined at a timing point 12T in the embodiment of the present invention. Accordingly, the HARQ RTT of the TTI bundling mode is determined to be 12 TTIs.

Figure 9:
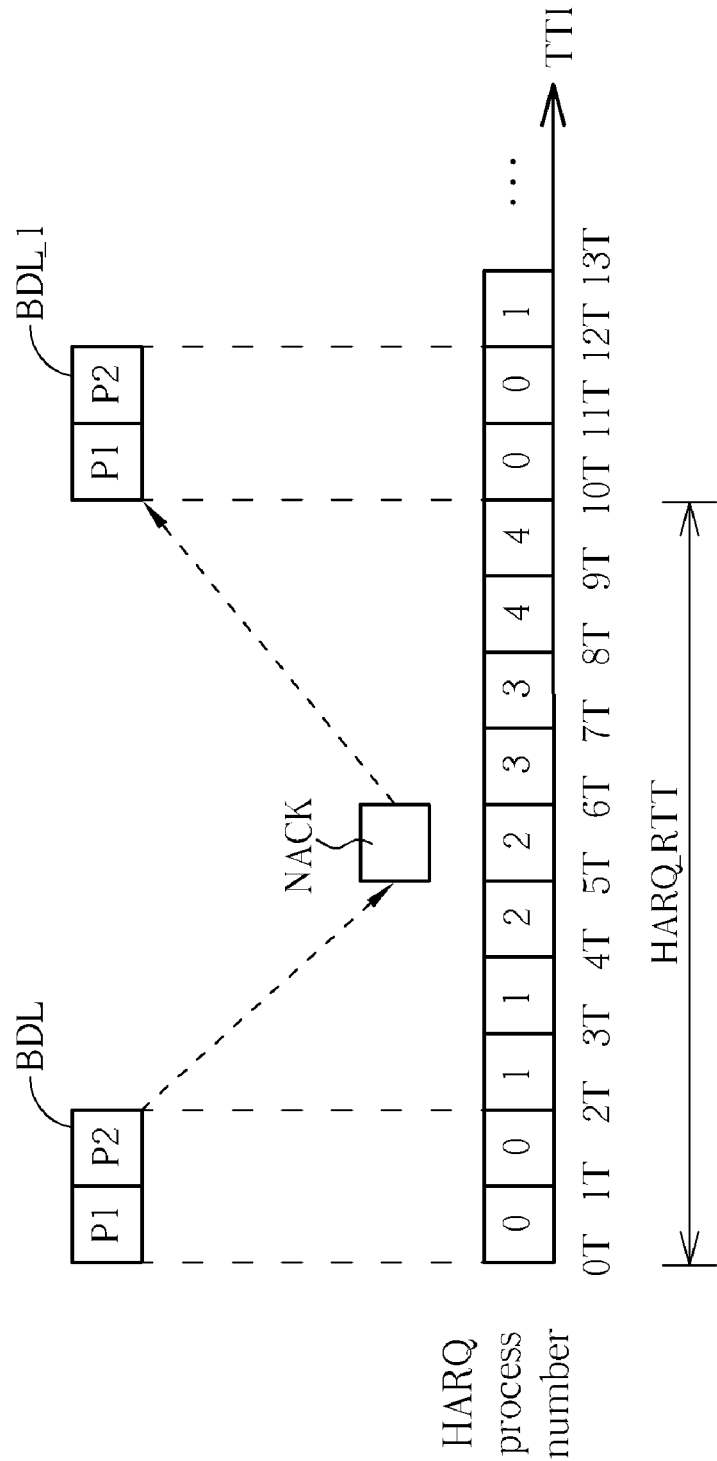

Similarly, please refer to FIG. 9, which illustrates another exemplary embodiment according to the process 70 of the present invention. In FIG. 9, packets P1 and P2 form a bundle BDL, and the bundle size is 2 TTIs. Assuming that the HARQ feedback is transmitted at a timing point that is four TTIs behind the last transmission of the bundle BDL (i.e. timing points 5T to 6T), and the UE requires at least four TTIs to prepare for retransmission of the bundle BDL after the HARQ feedback NACK is received (i.e. the UE capability is 4 TTIs and a retransmission bundle BDL_1 should be performed after a timing point 10T). In this case, since the number of TTIS between the last transmission of the bundle BDL (i.e. a timing point 2T) and the first transmission of the retransmission bundle BDL_1 should be a multiple of the bundle size, the start transmission time of the retransmission bundle BDL_1 is then determined at a timing point 10T in the embodiment of the present invention. Accordingly, the HARQ RTT of the TTI bundling mode is determined to be 10 TTIs.

Please note that FIG. 8 and FIG. 9 are merely exemplary illustrations according to the process 70 of the present invention. Practically, the bundle size is defined as four TTIs in the current specification. In this case, if the process 70 is applied, the HARQ RTT of the TTI bundling mode is reduced to 12 TTIs. Compared to 16 TTIs required by the prior art, the embodiment of the present invention can significantly reduce transmission delay and enhance system performance.

In addition, the embodiment of the present invention can further determine the number of HARQ processes of the TTI bundling mode according to the HARQ RTT and the bundle size. Taking FIG. 8 as an example, where the HARQ RTT is 12 TTIs and the bundle size is 3 TTIS, the number of HARQ processes is preferably determined as 4 in order for obtaining optimum transmission efficiency. Such variations also belong to the scope of the present invention.

In summary, the embodiment of the present invention provides a method for handling the TTI bundling mode in a UE of a wireless communication system to improve TTI bundling transmissions and enhance system performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for handling a Transmission Time Interval (TTI) bundling mode in a user equipment (UE) of a wireless communication system, the method comprising:
   switching an operation status of the TTI bundling mode; and
   flushing all uplink Hybrid Automatic Repeat Request (HARQ) buffers in the UE when the operation status of the TTI bundling mode is switched.

2. The method of claim 1, wherein the operation status of the TTI bundling mode is switched according to upper layer signaling.

3. The method of claim 1, where the step of switching the operation status of the TTI bundling mode comprises activating the TTI bundling mode.

4. The method of claim 1, where the step of switching the operation status of the TTI bundling mode comprises deactivating the TTI bundling mode.

5. The method of claim 1, wherein a single transport block is coded and transmitted at a plurality of consecutive TTIs within the said TTI bundling mode.

6. A communication device for handling a Transmission Time Interval (TTI) bundling mode in a user equipment (UE) of a wireless communication system, the communication device comprising:
   a processor for executing a program; and a memory coupled to the processor for storing the program; wherein the program comprises:
      switching an operation status of the TTI bundling mode; and
      flushing all uplink Hybrid Automatic Repeat Request (HARQ) buffers in the UE when the operation status of the TTI bundling mode is switched.

7. The communication device of claim 6, wherein the operation status of the TTI bundling mode is switched according to upper layer signaling.

8. The communication device of claim 6, where the step of switching the operation status of the TTI bundling mode comprises activating the TTI bundling mode.

9. The communication device of claim 6, where the step of switching the operation status of the TTI bundling mode comprises deactivating the TTI bundling mode.

10. The communication device of claim 6, wherein a single transport block is coded and transmitted at a plurality of consecutive TTIs within the said TTI bundling mode.

* * * * *